Charles L. Lehman
Alvin H. Lehman
INVENTORS

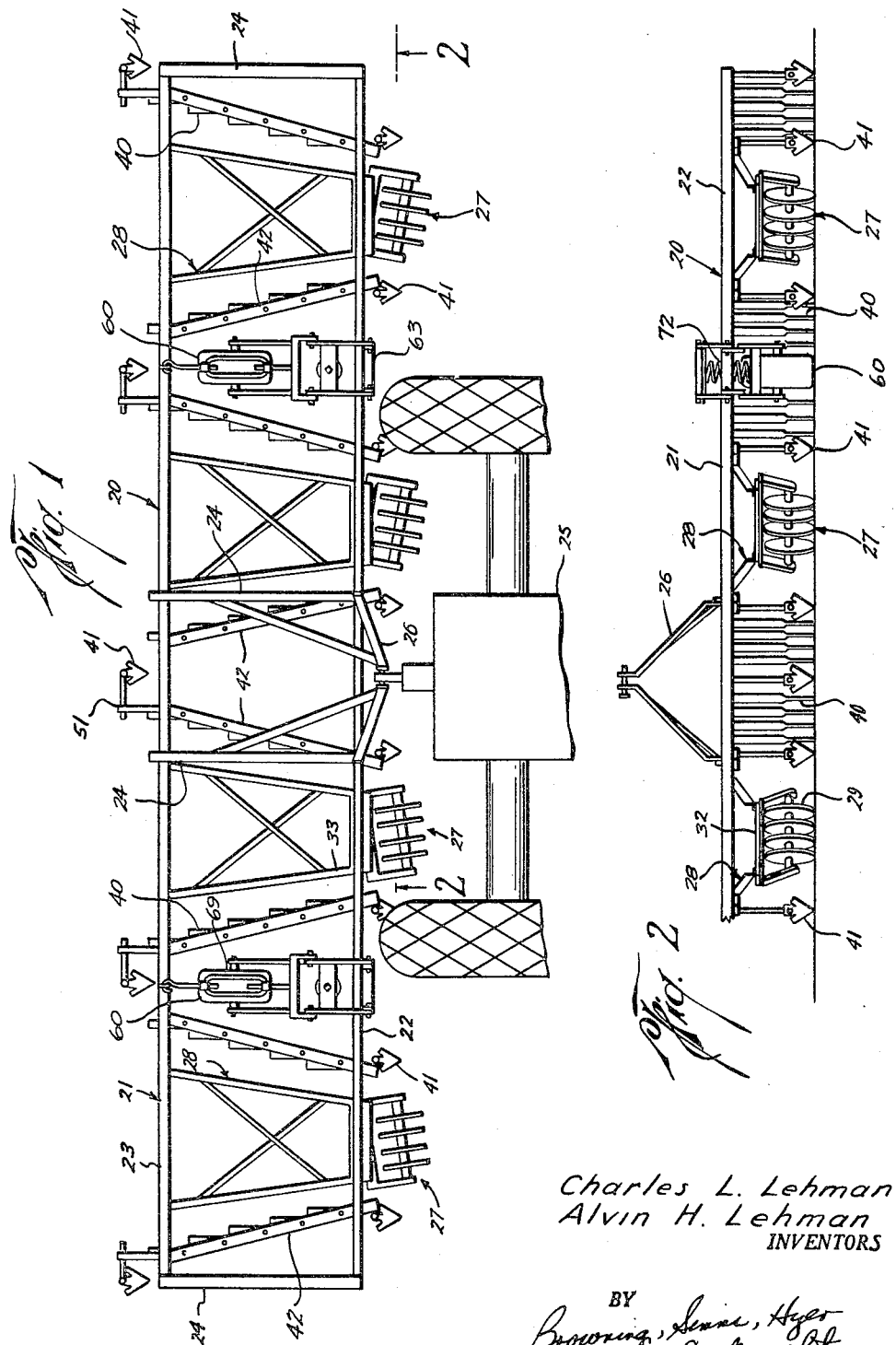

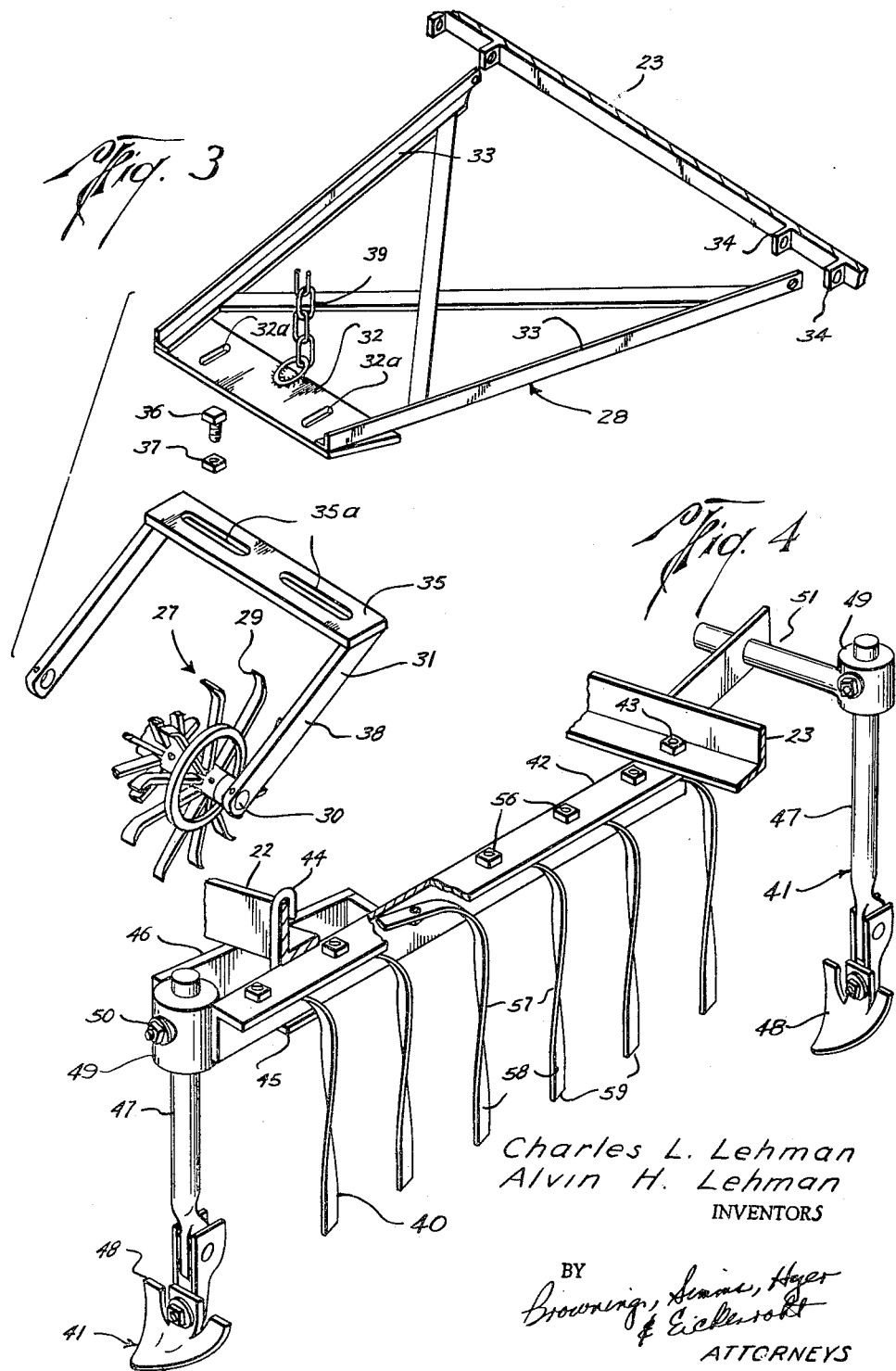

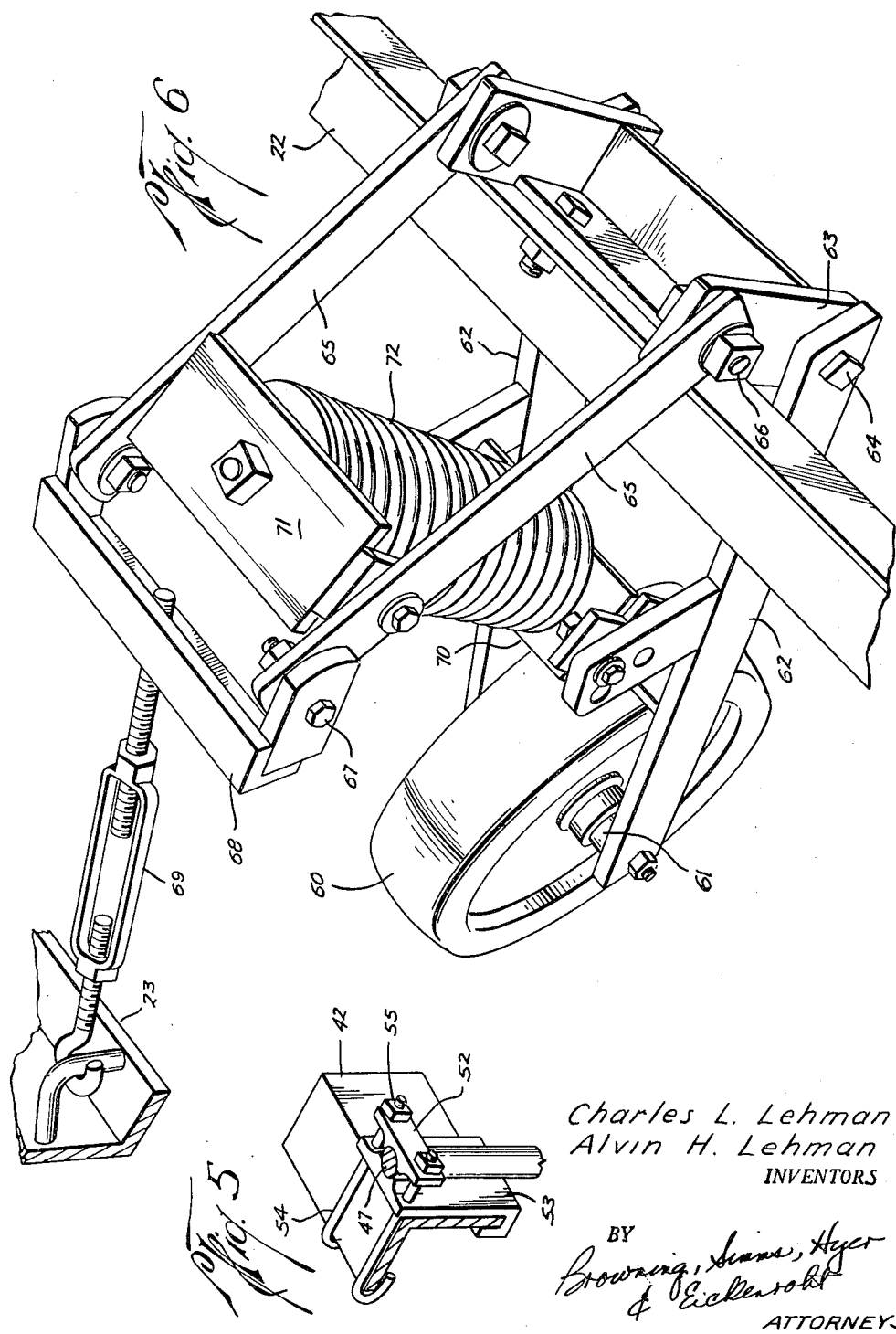

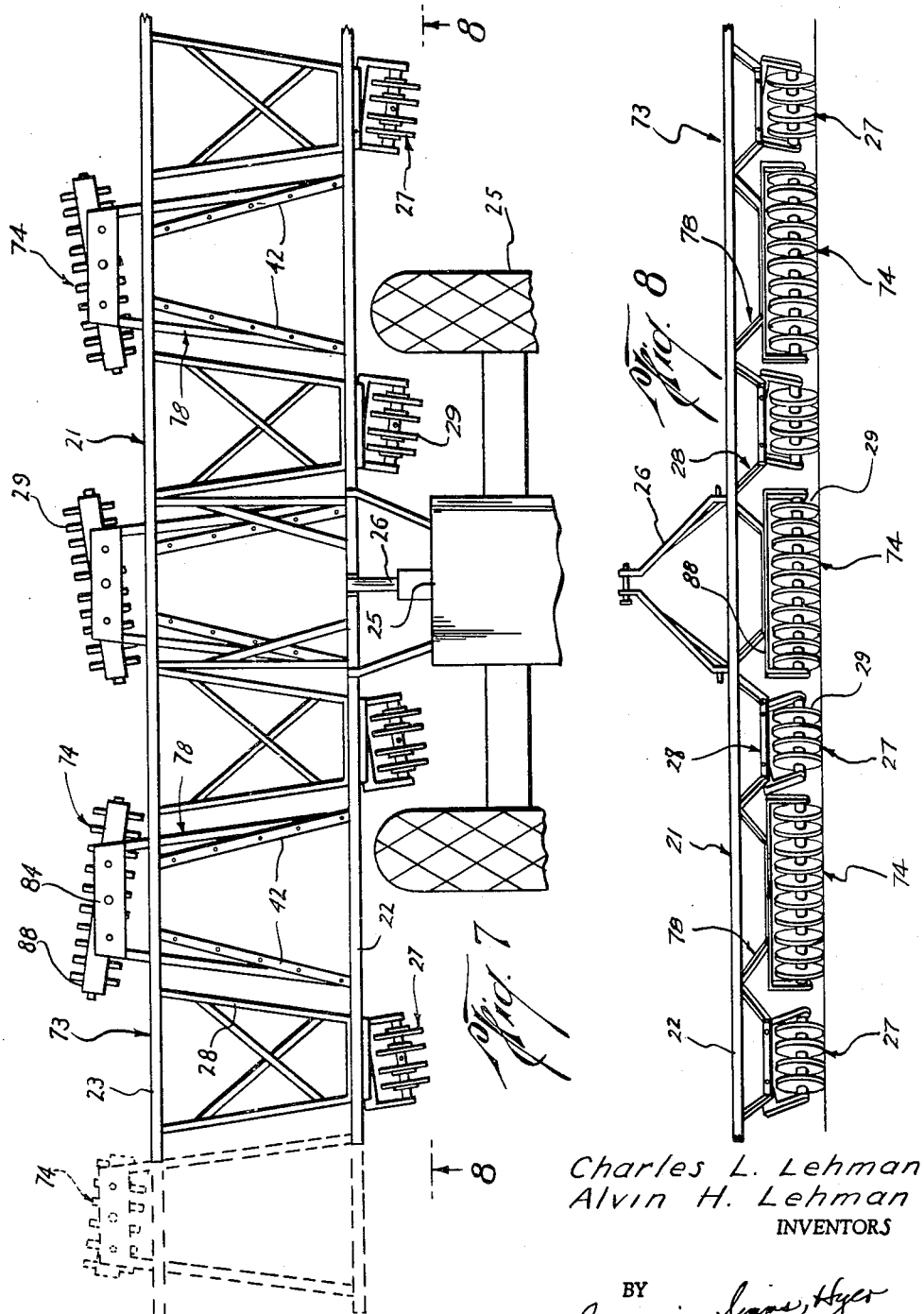

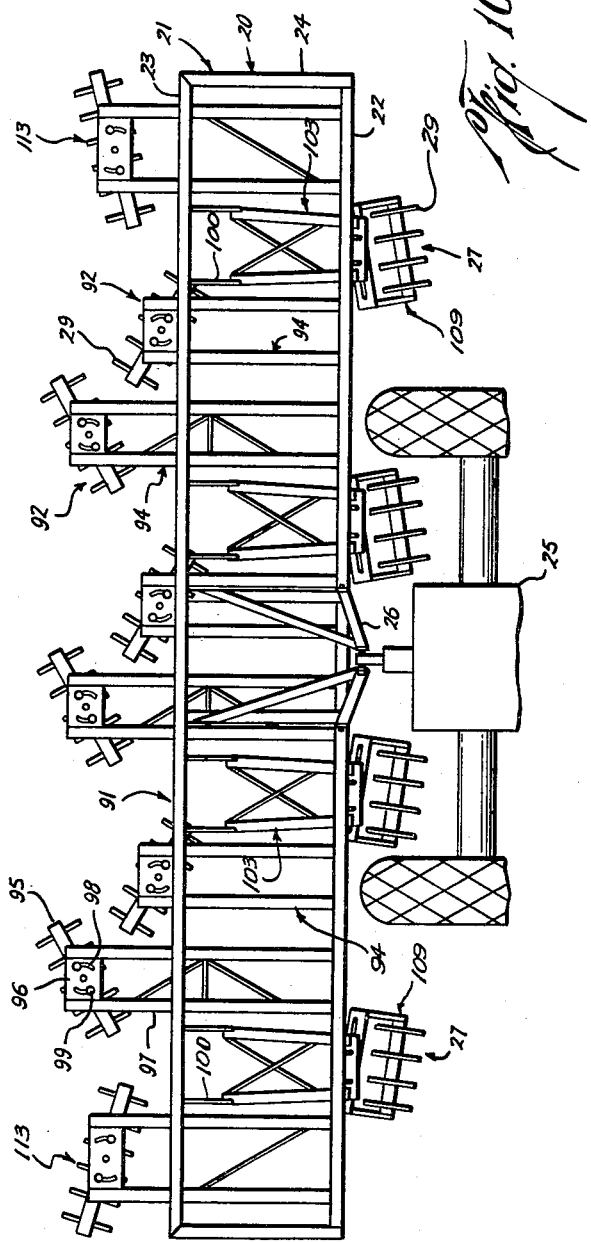
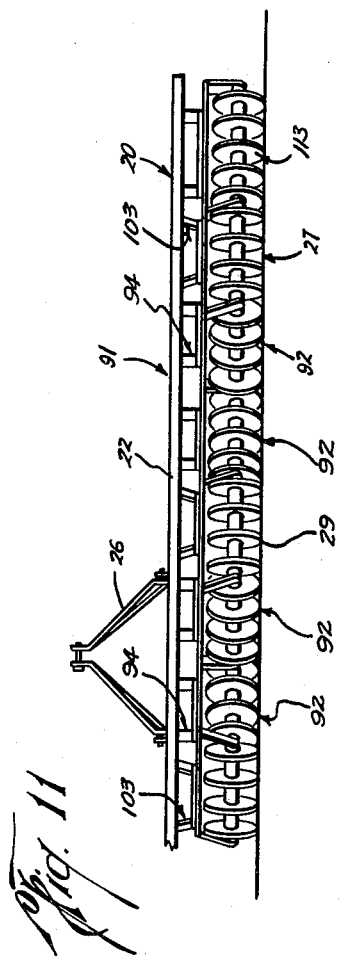
Charles L. Lehman
Alvin H. Lehman
INVENTORS

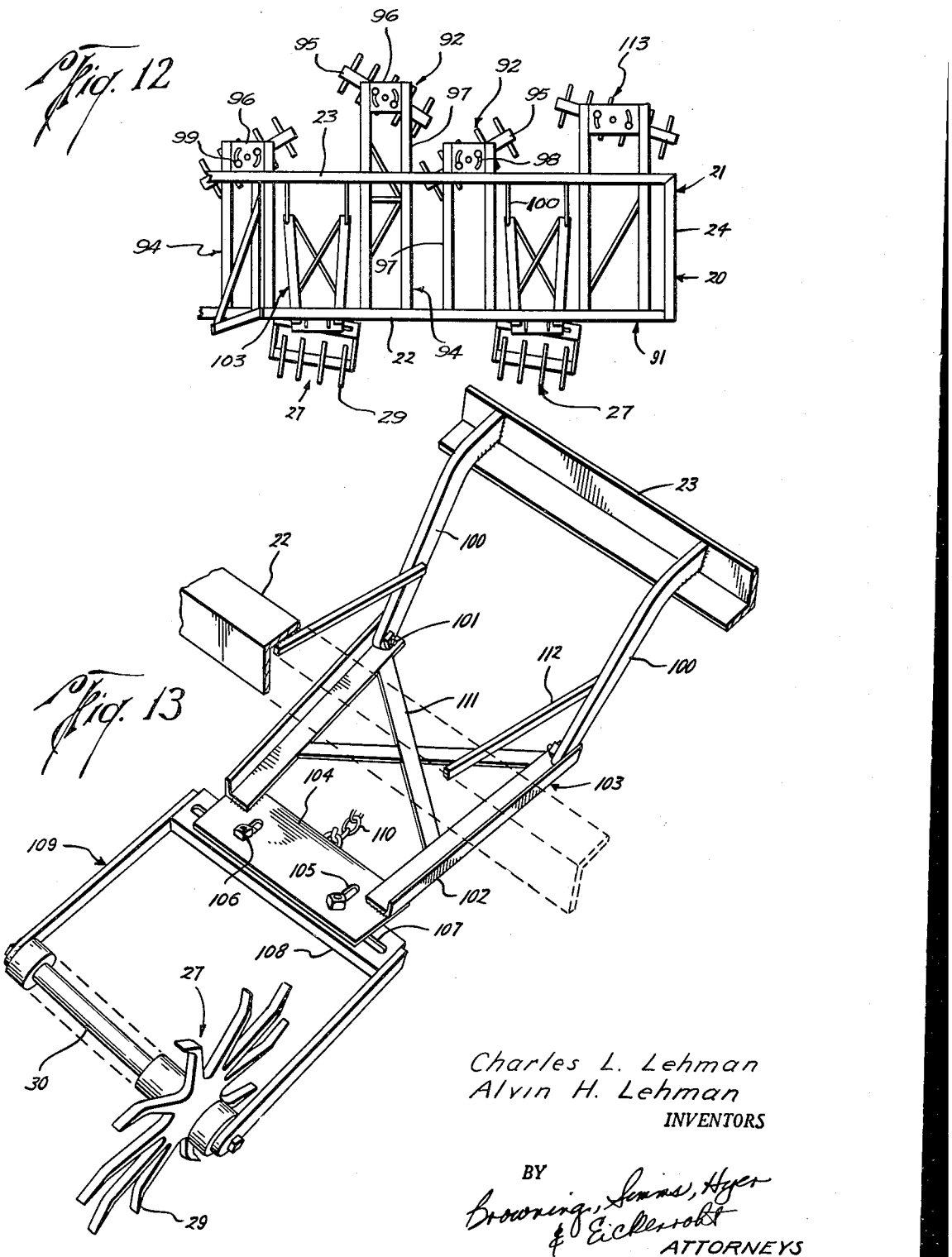

Aug. 1, 1961    C. L. LEHMAN ET AL    2,994,387
CULTIVATOR
Filed June 12, 1961    9 Sheets-Sheet 8
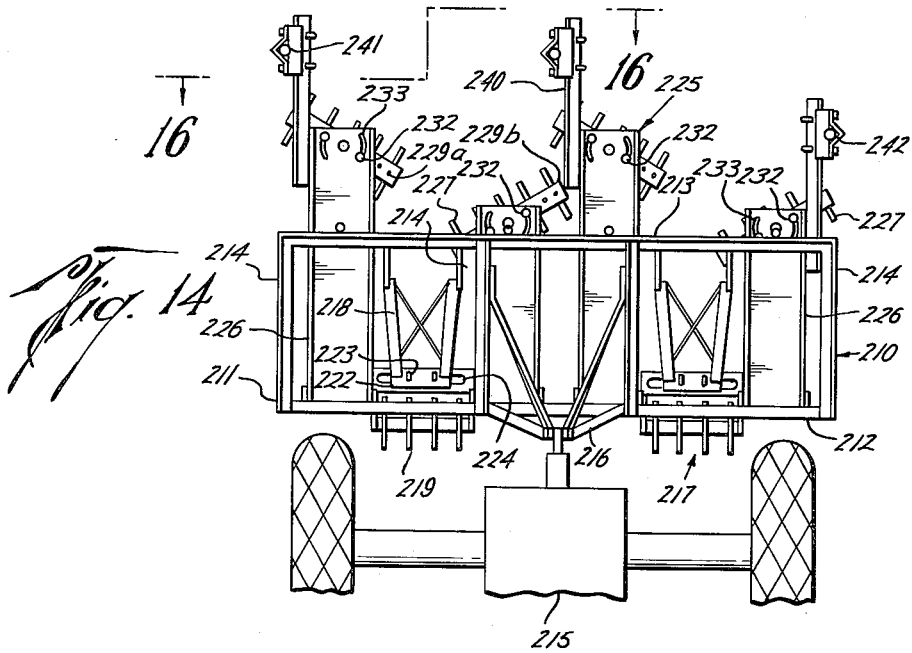
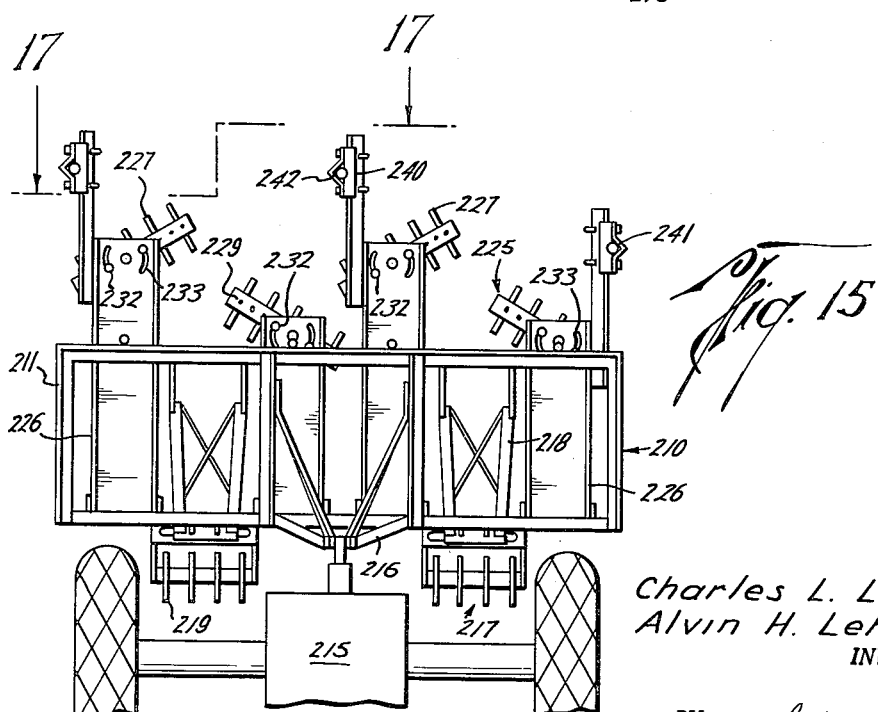
Charles L. Lehman
Alvin H. Lehman
INVENTORS
BY Browning, Simms, Hyer & Eickenroht
ATTORNEYS

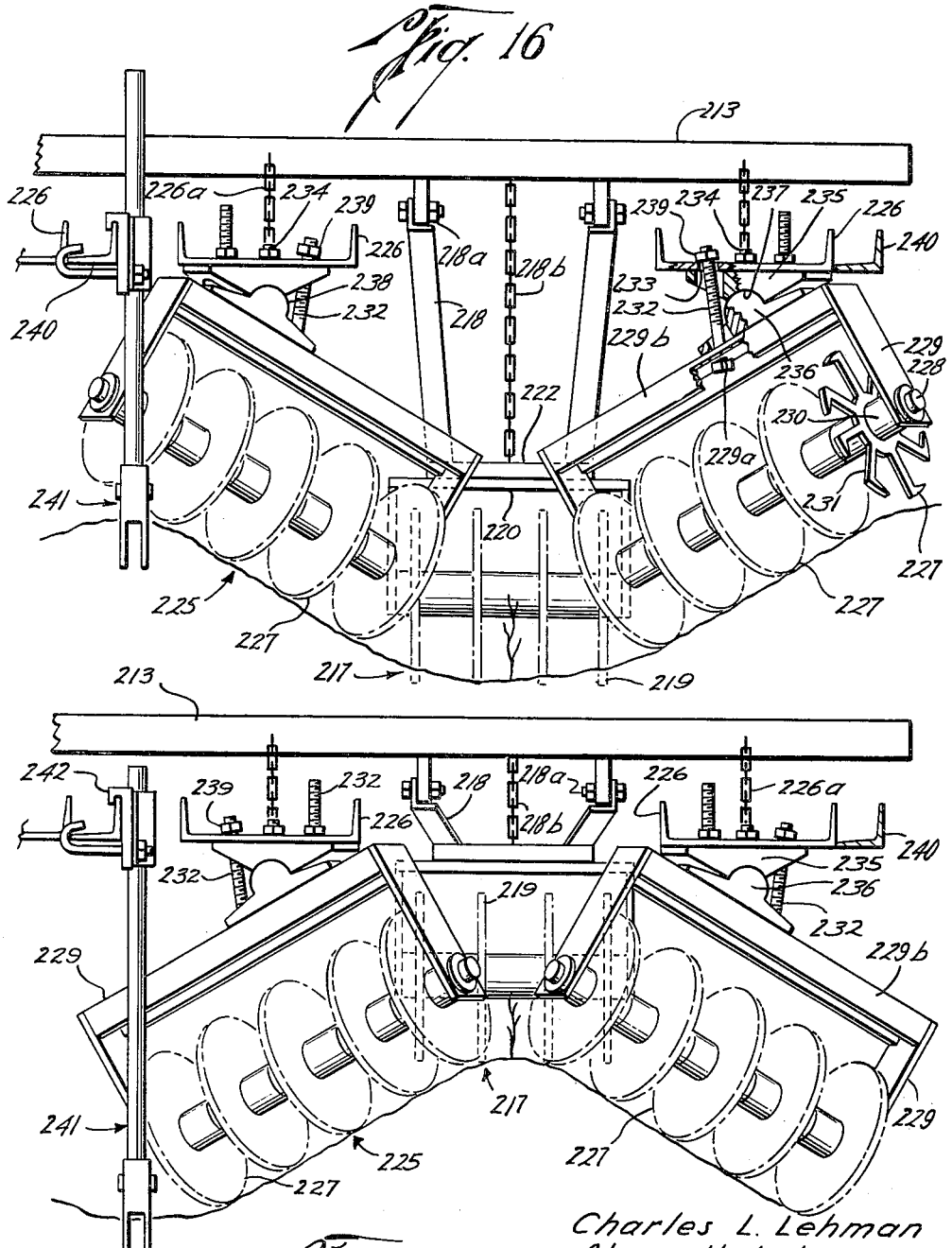

United States Patent Office 2,994,387
Patented Aug. 1, 1961

2,994,387
CULTIVATOR
Charles L. Lehman and Alvin H. Lehman, both of Rte. 3, Box 53, Corpus Christi, Tex.
Filed June 12, 1961, Ser. No. 113,993
26 Claims. (Cl. 172—587)

This invention relates generally to apparatus for cultivating row crops, and, more particularly, to a rotary cultivator.

This application is a continuation-in-part of our co-pending applications, Serial No. 800,304, filed March 18, 1959, and entitled, "Cultivator," now abandoned, and Serial No. 54,468, filed September 7, 1960, and entitled "Cultivator," now abandoned.

In a conventional rotary cultivator, rotary hoes are fixedly secured across the width of a frame in multiple rows so that, as the frame is moved forwardly, the ends of the legs of each hoe successively penetrate the ground to break up its upper crust. If, however, the ground is not level, the crops from the high rows may be pulled up due to the concentrated weight of the hoes imposed upon them, while the low rows may not even be touched by the hoes. Still further difficulty is encountered when the crops to be cultivated are planted either high on a row or deep in a row.

Ordinarily, weeds are rooted only in the surface crust of the ground above the more deep-rooted crops such that they may be pulled up by the rotary hoes without damage to the crops themselves. When the crops are high, it is desirable to kill off the chopped weeds by covering them with dirt from between the rows. It may also be desirable to build up the row in order to facilitate operation of a mechanical picker or the like. On the other hand, when the crops are low, caution should be taken to see that they are not covered by dirt from between the rows.

An object of this invention is to provide a rotary cultivator having separate gangs of "free-floating" rotary hoes which will engage the row crops with a greater force than heretofore possible with cultivators having conventional free-floating gangs of hoes.

Another object is to provide a rotary cultivator having separate gangs of free-floating rotary hoes which are individually free to conform to the contour of the row each engages.

A further object is to provide a rotary cultivator having separate gangs of free-floating rotary hoes whose ground turning action may be regulated by their angular adjustment with respect to the row crops without a substantial change in their tracking pattern.

Still another object is to provide a rotary cultivator having rotary hoes which will uniformly engage the row crops as well as the ground between the rows regardless of the contour thereof and which will permit the weeds to be pulled from the row crops and covered with dirt turned from between the rows.

A still further object is to provide a rotary cultivator of the type above described in which the rotary hoes are mounted with respect to one another in a compact arrangement which, at the same time, enables them to engage the ground with maximum leverage.

Yet another object is to provide such a rotary cultivator which is readily adjustable in a manner to prevent dirt from between the rows being turned onto the crops.

Another object is to provide a cultivator which is readily adjustable for use in cultivating different widths of rows, or even double row crops, as well as in turning a greater or lesser amount of dirt onto the rows.

Still another object is to provide a cultivator in which the cultivating elements thereof are selectively interchangeable with one another to turn dirt from between the rows in either of two directions.

Still a further object is to provide a cultivator having a vehicular frame for supporting the cultivating elements in a manner to permit the force with which such elements engage the ground to be adjusted to a desired amount.

A still further object of this invention is to provide an improved cultivator of the type above described in which the ground intermediate either high or deep planted crops may be turned either toward or away from the crops.

Yet another object is to enable the above-described cultivator to be converted for such use with a minimum of time and expense.

Other objects, advantages and features of this invention will be apparent to one skilled in the art upon a consideration of the written specification, the attached claims and the annexed drawings.

These and other objects are accomplished, in accordance with this invention, by a cultivator which comprises a frame adapted to be moved forwardly over the ground and a plurality of separate gangs which are mounted from the frame for swinging about a transverse axis to rotatably engage spaced-apart rows of crops in a laterally extending row during forward movement of the frame. Each such gang is also swingable about a vertical axis to adjust the angular relation of the path of rotation of the hoes thereof with respect to the rows; and means are carried by the frame for turning the ground intermediate adjacent rows of crops and rearwardly of the engagement therewith of the gangs with the crops.

From the foregoing, it will be apparent that each gang is free-floating so as to conform to the ground levels of the row crops. It will also be apparent that the angular adjustment of each gang enables regulation of the extent with which the weeds are chopped out of the crops.

Each separate gang is pivotally mounted from the frame for swinging about an axis rearwardly of the engagement of the hoes of such gang with the ground. In this manner, the hoes engage the ground with a "pushing" action which causes them to penetrate the ground with a greater force than the conventional "pulled" type of hoes. In one form of the invention, the support for each gang of rotary hoes may be pivotally mounted from the frame for swinging about a longitudinal axis so that each gang is free to rock into conformity with the contour of the row it engages.

More particularly, each such gang of free-floating rotary hoes is carried by a bracket which is connected to a support pivotally mounted on the frame in such a manner that the bracket may be swung about the aforementioned vertical axis without changing the lateral position of the gang. Thus, the degree of chopping action may be regulated without a change in the tracking pattern of the gang of rotary hoes.

In accordance with certain of the forms of the present invention, the aforementioned means for turning the ground intermediate and rearwardly of the engagement of the first-mentioned gangs with adjacent rows of crops comprises additional separate gangs of rotary hoes pivotally mounted on the frame for swinging about a transverse axis similarly to said first-mentioned gangs. Each additional gang is also similarly swingable about a vertical axis to adjust the angular relation of the path of rotation of the hoes of such gang with respect to the forward movement of the frame. Thus, the ground between the rows are also engaged with a uniform force regardless of its contour, and the extent to which such ground is turned onto the crops may be increased or decreased, as desired.

In accordance with a further novel aspect of the invention, these additional gangs of rotary hoes are pivotally mounted on the frame for swinging about a transverse axis forwardly of their engagement with the ground as well as the engagement of the gangs of rotary hoes with the row crops. This combination "pushing" and "pulling" arrangement of the gangs of rotary hoes engageable with the row crops and the ground between the crops, respectively, enables the width of the cultivator from front to back to be kept to a minimum while, at the same time, causing the rotary hoes to engage the ground with a maximum leverage.

In the preferred of the above-mentioned forms, the additional gangs of rotary hoes include a pair of gangs engageable with the ground between adjacent rows. Due to the aforementioned angular adjustment, these pairs of gangs may be swung between positions in which they are rearwardly convergent with respect to one another and in which they are rearwardly divergent with respect to one another for turning the ground onto the row crops and preventing such ground from being so turned, as desired. More particularly, the gangs of each pair are mounted to engage the ground in longitudinally offset and laterally overlapping relation with one another so that all of the ground between the rows will be turned regardless of the angular adjustment of such gangs. Still further means are provided for tilting the gangs of each pair from one side to the other of a level position. Thus, such gangs may be tilted to downwardly convergent positions when the crops to be cultivated are low in a row, and to upwardly convergent positions when such crops are high on a row.

In accordance with another form of the invention, the means for turning the ground between the crops comprises one or more of the conventional flexible teeth or sweeps. One novel aspect of this form of the invention involves the suspension of such cultivating elements from spaced-apart beams which are pivotally mounted on the frame toward their rear ends for swinging about a vertical axis and suspended from the frame at their forward ends for sliding laterally thereof. This enables the cultivating elements to be moved toward or away from the row crops for increasing or decreasing the amount of dirt it turns onto such rows. It also enables the width of the ground to be turned to be narrowed in the event that wider, or even double, rows of crops are to be cultivated.

It is further contemplate that the teeth suspended by such beams may comprise a thin bar having a lower portion angularly disposed with respect to forward movement of the frame so as to turn the ground in one direction and a lower edge tapered to define a forward point for engaging the ground. When it is desired to turn the ground in a different direction, the teeth suspended from one beam may be interchanged with those suspended from the other beam of the pair.

It is still further contemplated that one or more teeth suspended from the beam may be replaced by a sweep suspended from an intermediate portion of the beam in a manner to permit it to be moved longitudinally thereof with a minimum of time and effort.

In accordance with yet another novel aspect of the invention, one or more wheels are mounted on the frame from which cultivating elements are suspended in such a manner as to permit adjustment of the force with which such elements are caused to engage the ground. More particularly, the wheels are pivotally mounted from the frame and urged by a compression spring downwardly against the ground with a force which is readily adjustable by an extendible and retractable device.

In the drawings, wherein like reference characters are used throughout to designate like parts:

FIG. 1 is a plan view of one form of cultivator constructed in accordance with the present invention wherein the ground between the row crops is engaged by sweeps and teeth for turning it onto the adjacent row crops;

FIG. 2 is a front elevational view of the cultivator of FIG. 1, as seen along broken line 2—2 thereof;

FIG. 3 is a perspective exploded view of one of the gangs of rotary hoes of the cultivator of FIGS. 1 and 2, together with the floating support therefor;

FIG. 4 is a perspective view of some of the sweeps and flexible teeth of such cultivator together with the beam supporting same;

FIG. 5 is another perspective view of an alternative construction for supporting a sweep along an intermediate portion of the beam of FIG. 4;

FIG. 6 is a perspective view of one of the wheels supporting the frame of the cultivator of FIGS. 1 and 2;

FIG. 7 is a top plan view of another form of cultivator constructed in accordance with the present invention and wherein the ground between the row crops is engaged by additional gangs of rotary hoes for turning the soil to one or the other of the adjacent row crops;

FIG. 8 is a front elevational view of the cultivator of FIG. 7, as seen along broken lines 8—8 thereof;

FIG. 10 is a top plan view of a still further form of cultivator constructed in accordance with the present invention and wherein the ground between the row crops is engaged by additional rotary hoes arranged in pairs for turning the soil onto the row crops;

FIG. 11 is a front elevational view of part of the cultivator of FIG. 10;

FIG. 12 is a top plan view of part of the cultivator of FIGS. 10 and 11, with the additional gangs of rotary hoes moved to a position for preventing the soil from being turned onto the row crops;

FIG. 13 is a perspective view of one of the gangs of rotary hoes of the cultivator of FIGS. 10 to 12 for engaging the row crops together with a modified floating support therefor;

FIG. 14 is a top plan view of yet another cultivator constructed in accordance with the present invention, and wherein the rear gangs are swung about a substantially vertical axis to positions for turning the ground intermediate the spaced-apart rows of crops engaged by the forward gangs onto such crops;

FIG. 15 is a view similar to FIG. 14, but wherein the rear gangs have been swung to oppositely disposed positions for turning such ground away from the crops;

Figure 9:
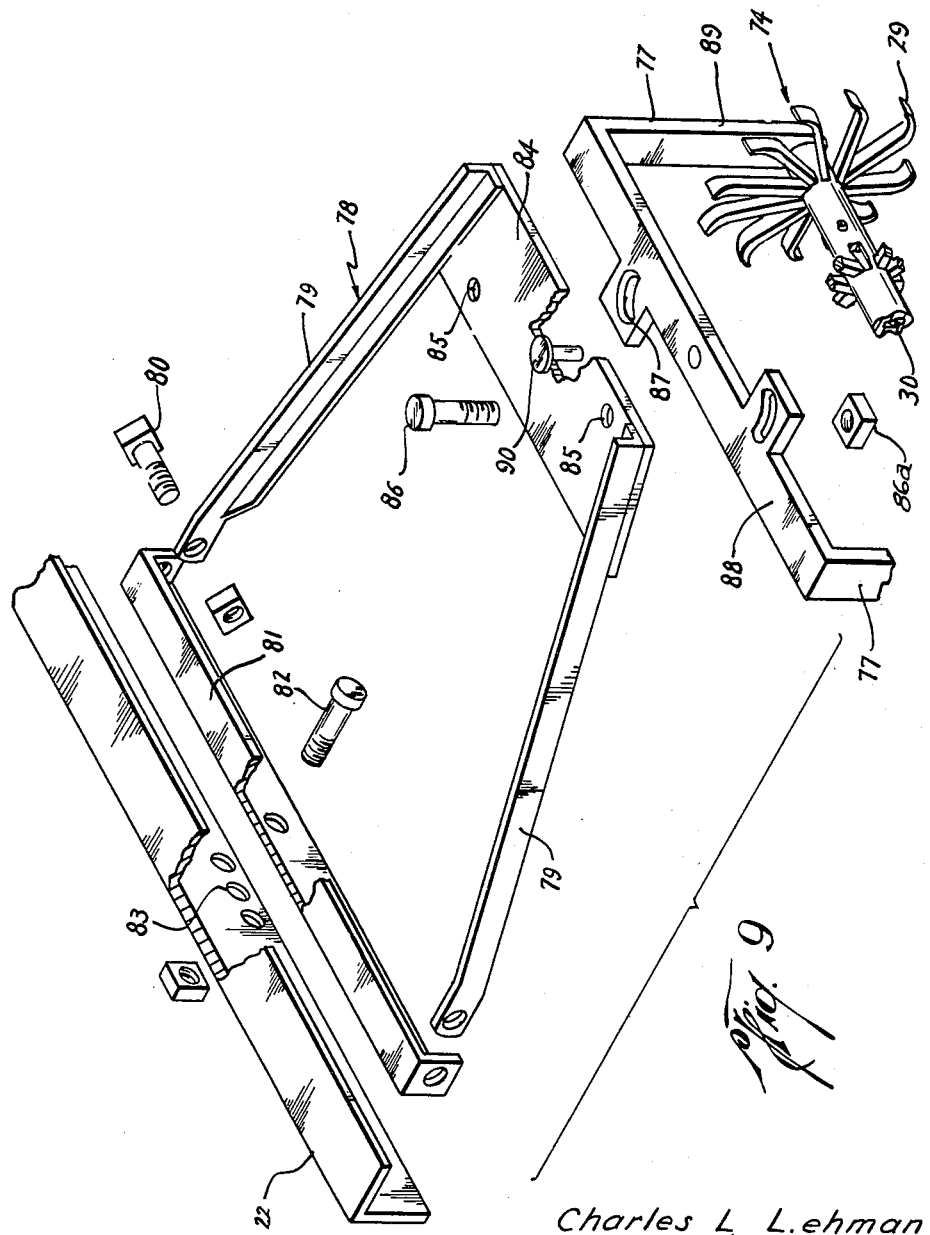
FIG. 9 is a perspective exploded view of one of the additional gangs of rotary hoes of the cultivator of FIGS. 7 and 8.

FIG. 16 is an enlarged rear view of part of the cultivator, as seen along broken line 16—16 of FIG. 14 and showing the rear gangs tilted about horizontal axes to positions for turning such ground onto a deep planted row of crops; and FIG. 17 is also an enlarged rear view of the cultivator, but seen along broken line 17—17 of FIG. 15 and showing the rear gangs tilted to positions for turning such ground away from a high planted row of crops.

Referring now to the above-described drawings in more detail, the cultivator shown in FIGS. 1 to 4, and designated in its entirety by the reference character 20, comprises a frame 21 having parallel laterally extending front and rear members 22 and 23 rigidly connected to one another by cross members 24 at opposite ends and along intermediate portions thereof. The frame is adapted to be moved forwardly (to the right in FIG. 1) by means of a tractor 25 connected thereto by a conventional three-point hitch 26 or other suitable means, which may be connected to the intermediate cross members 24.

Separate gangs 27 of rotary hoes are mounted from the frame 21 for swinging about a transverse axis to rotatably engage spaced-apart rows of crops in a laterally extending row during forward movement of the frame. More particularly, and as best shown in FIG. 3, each gang 27 is individually mounted from a support 28 pivotally connected to the rear frame member 23 to engage the row crops forwardly of the pivotal axis of the support. In this manner, the rotary hoes are "pushed" over the row crops so as to engage the ground with greater force than in the customary "pulled" type of hoe.

More particularly, each gang includes a plurality of individual hoes 29 rotatably mounted about a shaft 30 carried by a bracket 31, as best shown in FIG. 3. Each of the brackets is, in turn, connected to a plate 32 of the support 28 which is connected to the forward ends of bars 33 pivotally connected at their rearward ends to lugs 34 on the inner side of the rear frame member 23. As can be seen from FIG. 3, there are spaced-apart pairs of lugs 34 which permit the position of the gangs of rotary hoes to be adjusted in a lateral direction to accommodate different spacing between row crops. At any rate this pivotal support for the gangs enables them to adjust to different elevations of the row crops so that each crop will be engaged by its particular gang of hoes with substantially the same force.

Again as shown in FIG. 3, a plate 35 across the upper end of the bracket 31 is connected to the plate 32 of the support 28 for swinging about a vertical axis. For this purpose, the plate 35 of the bracket is provided with laterally extending slots 35a and the plate 32 is provided with longitudinally extending spaced-apart slots 32a for receiving bolts 36 which may be tightened against opposite sides of the plates by means of nuts 37. In this manner, the hoes of each gang may be swung to a position, as shown in FIGS. 1 and 2, wherein they are angularly disposed with respect to the row crops and the forward movement of the frame. When so disposed, the turned ends of the legs of the hoes will slide through the upper crust of the ground to chop out the weeds without uprooting the crops. As previously mentioned, the extent of such chopping action may be increased by increasing the angular relation of the path of rotation of the hoes with respect to the row crops. Also, the gangs on opposite sides of the center of the frame may be swung into divergent positions, as shown in FIGS. 1 and 2, so as to prevent side draft.

It is preferred that the plate 35 of the bracket 31 be maintained flat with respect to the ground during use in order to prevent one end of the gang from being thrust into the ground when moved forwardly in an angular position. Thus, the plate 32 of the support 28 may be connected to the forwardly and downwardly extending side bars as shown in FIG. 3 to maintain it substantially flat in the average elevational position of the gang.

In the construction shown in FIG. 3, the side legs 38 depending from the plate 35 of the bracket 31 also extend forwardly so as to engage the ground as far forward as possible without interference with the frame during floating of the gangs. As a result of this construction, the tracking relation of the gang with respect to the row crops is changed when the bracket is pivoted about the bolts 36. However, the elongated slots 35a enable the bracket to be moved laterally to compensate for this condition each time the bracket is swung in the manner described. These elongated slots also enable the lateral position of the gangs to be adjusted for accommodating different spacing between row crops.

The forward ends of the support 28 are suspended from the frame by means of chains 39 or the like which may be taken up to lift the gangs off the ground during movement of the equipment to and from a job.

The teeth 40 and sweeps 41 are best shown in FIG. 4 to be suspended from beams 42 mounted on the frame between the front and rear frame members 22 and 23. More particularly, the beams are arranged in rearwardly convergent pairs between the supports 28 for adjacent gangs 27 of rotary hoes as well as on the outside of the end supports. With the teeth and sweeps so arranged on the frame, the ground between the row crops is broken up and turned onto adjacent crops so as to cover up the weeds which have been chopped therefrom.

More particularly, each of the beams 42 is pivotally mounted at its rearward end to the rear frame member 23 by means of a bolt 43 (see FIG. 4). The forward end of each of the beams is suspended from the front frame member 22 by means of a J-bolt 44 having its upper end hooked over the front frame member and a plate 45 on its lower end beneath the forward end of the beam. This J-bolt extends between one side of the beam and a plate 46 secured thereto so that it slides laterally over frame member 22 as the plate 45 slides longitudinally of the beam to permit the forward end of the beam to be swung about the pivot pins. This construction enables the forward ends of adjacent beams to be moved closer together in order to accommodate wider row crops and, in fact, to permit the replacement of the gangs 27 with wider gangs for double rows of crops. On the other hand, the forward ends of the beams may be moved inwardly or outwardly so as to increase or decrease the extent to which the ground between the rows is turned onto the crops.

Each of the sweeps 41 is of conventional construction comprising a shank 47 and a plow 48. As shown in FIG. 4, the shank 47 of one sweep is received through a cylinder 49 secured between the beam and the plate 46, and is fixed in such position at a desired depth by means of a set screw 50. The shank of another sweep is carried in a similar cylinder supported from bracket 51 secured to and extending rearwardly and laterally of the rear frame member 23. As can be seen from the drawings, the plows are substantially in line with the teeth 40, the rear plow being common to two rows of flexible teeth.

As an alternative to the construction just described, one or more of the teeth 40 may be replaced by an intermediate sweep, as shown in FIG. 5. More particularly, the shank 47 of the intermediate sweep is releasably secured between oppositely facing recesses in a clamp 52 and the outer side of a base 53. The inner side of the base is removably fitted over the outer side of a vertical flange of an angle iron forming the beam 42 by means of J-bolts 54. More particularly, the inner ends of the J-bolts hook over the end of the horizontal flange of the angle iron and the outer ends thereof extend through the base 53 and clamp 52 on opposite sides of the recess thereof. Bolts 55 threaded onto the ends of the J-bolts bear against the outside of the clamp 52 to releasably secure the shank of the sweep between the clamp and base. Loosening of these bolts also enables the position of the intermediate sweep to be adjusted longitudinally of the beam 42 as desired.

As shown in FIG. 4, each flexible tooth 40 preferably comprises a thin bar having an upper portion which is secured to the beam by means of bolts 56. This upper portion bends rearwardly and downwardly when so secured and has an intermediate portion 57 which is twisted about its length to provide a lower portion 58 angularly disposed with respect to the forward portion thereof as well as forward movement of the frame. More particularly, the lower edge of the lower portion is tapered to define a forward point 59 for first engaging the ground.

As shown, these teeth are suspended from the beam in substantially equally spaced-apart relation. With their upper portions extending substantially parallel to the forward movement of the frame, the angularly disposed lower portions will turn the soil between the rows to the side toward which they face. Ordinarily, it is desired to turn the soil outwardly toward the adjacent row, as shown in FIG. 4. However, this particular construction of the tooth enables the teeth of the conventional beams to be interchanged with respect to one another so as to turn soil away from the adjacent row crops. Obviously, this may be done without replacing the beams themselves, thereby enabling a considerable saving in time and trouble.

It is contemplated that the gangs of rotary hoes may be removed or lifted, as previously described, to convert this equipment to a more conventional type of cultivator. This may be desirable when the crop grows to a certain height.

The frame 21 is supported for movement over the ground by a pair of wheels 60 mounted on the frame, as best shown in FIG. 6, for engagement with the ground between the rows and, more particularly, between the flexible teeth carried by converging pairs of beams. Thus, with respect to FIG. 6, the axle 61 of each wheel will be seen to be rotatably mounted between a pair of arms 62 pivotally mounted on the lower end of a bracket 63 on the front frame member 22 by means of bolts 64 for swinging about a lateral axis. The forward ends of another pair of arms 65 are pivotally mounted to the upper ends of the bracket 63 by means of pins 66 for swinging about another lateral axis, and the rearward ends thereof are pivotally connected by means of pins 67 to a cross head 68. A turnbuckle 69 is connected at its opposite ends between the rear frame member 23 and the cross head 68 so that the extension and retraction of the turnbuckle is effective to swing the upper arms 65 about the axis of pins 66.

Plates 70 and 71 are secured between the pairs of arms 62 and 65, respectively, and a heavy compression coil spring 72 is disposed between such plates for urging the wheel 60 downwardly. Obviously, swinging of the arms 65 by manipulation of the turnbuckle will adjust the effective force of the spring for so urging the wheel. Thus, these wheels and their supports provide a means for adjusting the force with which the various cultivating elements heretofore described will engage the ground. Obviously, the spring may be compressed to an extent sufficiently to raise the cultivating elements off the ground.

The form of cultivator shown in FIGS. 7 to 9, and designated in its entirety by reference character 73, corresponds in many respects to parts of the cultivator just described and, for this reason, several of the parts thereof are designated by the same reference characters. For example, the cultivator 73 includes a frame 21 from which a plurality of separate gangs 27 of rotary hoes are mounted for swinging about a transverse axis to rotatably engage spaced-apart rows of crops in a laterally extending row and forwardly of such axis during forward movement of the frame. Thus, as previously described, each gang is free-floating so that it engages the ground with substantially the same force as it is "pushed" therealong. Each gang is also swingable about a vertical axis to adjust the angular position of the hoes 29 with respect to forward movement of the frame, as described in connection with the cultivator of FIGS. 1 to 6.

As distinguished from the first form of the invention, however, the form shown in FIGS. 7 to 9 includes additional gangs 74 of rotary hoes 29 for engaging the ground between the row crops. More particularly, and as will be described below these gangs of rotary hoes are also swingable about a lateral axis so as to be "free-floating" and a vertical axis to an angular position in which they will cultivate the soil between the rows and turn it onto an adjacent row crop. As shown in FIGS. 7 and 8, the gangs on opposite sides of the frame are turned oppositely with respect to one another to prevent side draft.

As in the case of the gangs 27, the angular position of the hoes 29 of the gangs 74 may be adjusted to regulate the extent to which the ground is agitated. This adjustment also determines the amount of soil which is turned from between the rows onto adjacent rows—i.e., a greater amount of soil is turned when the angular position of the gangs is increased.

The cultivator 73 may be converted to one of more or less conventional construction, as, for example, when the crops are high, by swinging all the gangs 27 and 74 to positions in which the axes of rotation of the hoes are disposed laterally. This cultivator is also convertible to one of the type described in connection with FIGS. 1 to 6 by the replacement of the gangs 74 with suitable teeth and sweeps suspended from the beams 42.

With reference to FIG. 9, it will be seen that the rotary hoes 29 of each gang 74 are rotatable about a shaft 30 supported from a bracket 77. This bracket is in turn connected to a support 78 which, similarly to the support 28 for the gangs 27, is pivotally supported from the frame for swinging about a lateral axis. However, this support is also rockable about a longitudinal axis so that the rotary hoes of each gang 74 accommodate themselves to the individual rows of crops.

For these purposes, the support 78 includes longitudinally extending and spaced-apart bars 79 having their forward ends pivotally connected by means of pins 80 to a laterally extending bar 81. This latter bar is, in turn, pivotally connected by means of a pin 82 to the front frame member 22 for rocking freely about the aforementioned longitudindal axis. As shown in FIG. 9, the front frame member 22 may be provided with one or more openings 83 therein to permit the lateral adjustment of the support 78 for reasons previously mentioned.

As can be seen from FIG. 7, the rotary hoes of the gangs 74 engage the ground just rearwardly of the rear frame member 23, while those of the gangs 27 engage the ground just forwardly of the front frame member 22. Thus, in addition to engaging the ground rearwardly of the transverse axis about which they swing, so as to be "pulled" therealong, the hoes of the gangs 74 engage the ground rearwardly of the hoes of the gangs 27, so that the supports 28 and 78 cross one another in oppositely extending relation from their pivotal connections to the frame. As previously described, this arrangement reduces to a minimum the front to rear width of the frame while, at the same time, suspending the gangs with a maximum of leverage.

A plate 84 is connected to the rearward ends of the bars 79 and is provided with a pair of spaced-apart openings 85 therein to receive bolts 86 which extend through arcuate slots 87 in the plate 88 extending across the top of the bracket 77. A nut 86a is threaded onto the end of each bolt to enable the aforementioned angular adjustment of the rotary hoes of each gang. Since the legs 89 of the brackets thereof extend downwardly from the plate 88 with the shaft 30 substantially beneath the central pivot pin 90 connecting the plates 84 and 88, the rotary hoes will be kept in substantially the same tracking position regardless of their angular adjustment. Also, as will be apparent from FIG. 9, the plate 84 will be disposed substantially parallel to the ground.

With reference now to FIGURES 10 to 13, the form of the cultivator shown therein, which is designated in its entirety by reference character 91, will also be seen to correspond in many respects to the cultivator first described. Therefore, as in the case of the cultivator shown in FIGS. 7 to 9, similar reference characters are used for indicating similar parts.

The principal distinction between the form of cultivator shown in FIGS. 10 to 13 and that shown in FIGS. 7 to 9 resides in the fact that the single gangs 74 are replaced by a pair of gangs 92 of rotary hoes 29. That is, although rotary hoes 29 are mounted for swinging about a lateral axis to engage the ground between row crops engaged by the gangs 27 of rotary hoes, in a manner similar to the gangs 74 of rotary hoes, they are split into individual gangs 92 which are arranged in pairs, and the pairs are so mounted from supports 94 as to be swingable into either divergent or convergent relation with respect to one another.

For example, as shown in FIG. 10, the gangs 92 of each pair may be swung into rearwardly convergent relation so as to turn the soil from the ground between the row crops onto such crops. This may be desirable, as previously mentioned when the crops are sufficiently high that the turned soil will cover the weeds without covering the crops. On the other hand, the gangs 92 of each pair may be turned to a position in which they are rearwardly divergent with respect to one another, as shown in FIG. 12, for cultivating the soil while preventing it from being turned onto the rowcrops adjacent thereto. Thus, in this latter case, the gangs 92 may be used to prevent relatively small crops from being covered with the soil.

For this purpose, each gang 92 of rotary hoes is supported from a bracket 95 which is in turn connected to a plate 96 on the rearward ends of bars 97 of the support 94. As best shown in FIGS. 10 and 12, the plate 96 may be provided with arcuate slots 98 to receive bolts 99 connecting the plate to the bracket for swinging similarly to the rotary hoes of gangs 74 of FIG. 9.

Although the gangs 92 of each pair both extend rearwardly so as to be "pulled" over the ground, similarly to the gangs 74, the support 94 for one of them is longer than the support for the other so that the one gang engages the ground rearwardly of the ground. This permits the gangs 92 of each pair to be adjusted angularly despite a lateral overlap with one another for maintaining full ground coverage between the rows, regardless of their angular positions. As in the case of the cultivator 73, however, the cultivator 91 may be converted into a more or less conventional rotary cultivator by swinging gangs 27 and 92 into positions with the rotational axes of the rotary hoes disposed laterally of the frame.

Although the means for mounting the "pushed" gangs 27 of rotary hoes for the form of cultivator shown in FIGS. 10 to 13 corresponds in many respects to that shown in FIG. 3, it will be noted from FIG. 13 that the pivotal axis about which the rotary hoes of these gangs swing has been lowered. This may be desirable, for example, to lessen the force with which the hoes engage the ground.

Thus, a pair of arms 100 are secured to the rear frame member 23 in depending relation therefrom and are pivotally connected at their lower ends by pins 101 to the rear ends of longitudinally extending bars 102 of a support 103. Similarly to the support 28 described in connection with FIG. 3, support 103 includes a plate 104 connecting the forward ends of the bars 102 and having longitudinal spaced-apart slots 105 to receive bolts 106. These bolts extend through lateral slots 107 in a plate 108 of bracket 109 supporting the axle for the rotary hoes 29 to permit the angular relation of the gangs 27 of rotary hoes to be adjusted in a manner previously described.

As also shown in FIG. 13, each gang may be raised above ground level by means of a chain 110 suspended from the frame during transporting of the cultivator to and from jobs. The support 103 is provided with crossed bracing members 111 as well as longitudinally extending reinforcing rods 112 which connect with the front frame member 22.

As shown in FIGS. 10, 11 and 12, other additional gangs 113 of rotary hoes may be mounted on the frame 21 outside of the endmost gangs 27 for swinging in the same manner as each gang 92. Also, of course, the angular adjustment of the gangs 113 may be adjusted as desired.

The cultivator illustrated in FIGS. 14 to 17, and designated in its entirety by reference character 210, corresponds in many respects to the one shown in FIGS. 10 to 13. Thus, it comprises a frame 211 having parallel laterally extending front and rear members 212 and 213, respectively. The latter are rigidly connected to one another by cross members 214 along their opposite ends and intermediate portions. The frame is adapted to be moved forwardly (downwardly in FIGS. 14 and 15 and away from the viewer in FIGS. 16 and 17) by means of a tractor 215 connected thereto by a conventional three point hitch 216 or other suitable means connected to the intermediate cross members 214.

Separate gangs 217 of rotary hoes are mounted from the frame 211 for free swinging about a transverse axis to rotatably engage spaced-apart rows of crops (see FIGS. 16 and 17) in a laterally extending row during forward movement of the frame. More particularly, each gang 217 is individually mounted from the front end of a support 218 pivotally connected at 218a (FIGS. 16 and 17) to the rear frame member 213 for extension forwardly thereof. In this manner, and as explained in connection with previous embodiments, the rotary hoes of gangs 217 are "pushed" over the row crops so as to engage the ground with greater force than in the customary "pulled" type of hoe. As shown in FIGS. 16 and 17, chains 218b connect each support 218 with the frame so that the gangs may be raised during turning or transportation.

Each gang 217 includes a plurality of individual hoes 219 which are shown only diagrammatically in the drawings, but which may be of conventional construction, as will be described hereinafter in connection with the rotary hoes of the rear gangs. In any case, the rotary hoes are rotatably mounted about a shaft (not shown) carried by a bracket 220 which is, in turn, connected to a plate 222 on the front end of the support 218 for swinging about a vertical axis. Thus, as shown and described in previous embodiments, each bracket is suspended from a plate by means of lugs 223 which extend through openings in each plate and laterally extending openings 224 in the top of the bracket 222. More particularly, these openings in the plate 222 are elongated in a longitudinally extending direction to permit this swinging about a vertical axis. Thus, although the hoes 219 of the gangs 217 are shown in FIGS. 14 to 17 to be disposed parallel to the direction of movement of the frame, they may be turned or swung either clockwise or counterclockwise to any desired position. At the same time, each gang 217 may be adjusted laterally with respect to the frame to accommodate different spacing between rows of crops as well as to compensate for the aforementioned swinging about the vertical axis.

Each rear gang 225 is mounted from the frame 211 by means of a support 226 pivoted from the front frame member 212 in any suitable manner, such as shown in the previous embodiments. Each support extends rearwardly from the front of the frame and each gang 225 is mounted on the rear end of its support 226 to engage the ground rearwardly and intermediate the engagement of the forward gangs 217 with the row crops. More particularly, and as shown in FIGS. 14 and 15, the rear gangs 225 are arranged in pairs intermediate adjacent front gangs 217, with the support 226 for one gang of such pair being longer than the other so that the gangs of each pair are longitudinally offset with respect to one another. As will be obvious from FIGS. 14 and 15, this enables the rear gangs to overlap laterally to provide full coverage of the ground intermediate the row crops. As shown in FIGS. 16 and 17, there are chains 226a to connect the supports with the frame for raising the gangs 225 with the gangs 217.

Although the illustrated cultivator has only two front gangs 217 for cultivating an equal number of row crops, it is obvious that more front gangs, as well as corresponding rear gangs therebetween, may be provided as desired.

Each gang 225 also includes a plurality of rotary hoes 227 rotatably mounted about 228 (see FIGS. 16 and 17) carried by a U-shaped bracket 229. As shown by the rightmost rotary hoe 227 in FIG. 16, each comprises a hub 230 having a plurality of radially extending legs 231 thereon with the outer ends of the legs being turned forwardly. As previously mentioned, each rotary hoe 19 of the forward gangs 217 may be similarly constructed.

As in previous embodiments, each rear gang 225 is suspended from its support 226 for pivoting about a vertical axis by means of bolts 232 which extend through arcuate grooves 233 (FIGS. 14 and 15) in the outer end of each support 226 as well as holes 229a in the upper cross member 229b of each bracket 229. More particularly, there is an intermediate bolt 234 which extends through each support and bracket to permit the bracket to swing therabout as the bolts 232 slide within the grooves 233.

Thus, the bracket 229 of each of the gangs 225 may be swung beween the position shown in FIGS. 14 and 16, wherein the pair intermediate the front gangs 217 are rearwardly convergent, and the position of FIGS. 15 and 17, wherein such pairs of rear gangs are rearwardly divergent. In the former position, as described in the embodiment of FIGS. 10 to 13, the rotary hoes of each rear gang turn the ground intermediate the rows of crops in a direction onto them. On the other hand, in the latter position, the hoes of the rear gangs 225 turn the ground away from the crops.

In accordance with this particular embodiment, however, each rear gang 225 is also swingable about a substantially horizontal axis which extends parallel to the path of rotation of the rotary hoes of each such gang. As previously described, and as best illustrated in FIGS. 16 and 17, this enables each rear gang 225 to be swung or tilted between positions for engaging the ground intermediate either deep planted crops (FIG. 16) or high planted crops (FIG. 17). In both such positions, each gang 225 may also be swung about its vertical axis, and in a manner previously described, between positions for turning the ground away from the crops (FIG. 17) or toward the crops (FIG. 16). Of course, FIGS. 16 and 17 show only a part of the rear of the cultivator, and it will be understood that the other forward gang 217, together with the rear gangs 225 disposed for engaging the ground on each side thereof, will simultaneously cultivate an adjacent row of crops.

The aforementioned tilting of each rear gang 225 is accomplished by the provision of bearing parts in the form of castings 235 and 236 on the lower side of the support 226 and cross member 229b of the bracket 229, respectively. More particularly, each casting 235 is provided with a longitudinally extending groove 237 having an arcuate bearing surface for a longitudinally extending and arcuately shaped ridge 238 on the upper side of the casting 236. Thus, with the nuts on the ends of the bolts 234 tightened up against support 226 and cross member 229b, the bearing surface on the ridge 238 is slidable over the bearing surface on the groove 237 to enable the bracket 229, and thus each gang 227, to swing about the aforementioned horizontal axis.

As also shown in FIGS. 16 and 17, each of the bolts 232 is of such length and threaded to such an extent as to permit its effective length to be adjusted between those illustrated in FIGS. 16 and 17. Thus, nuts 239 threaded onto each end of the bolts 232 may be taken up or backed off to shorten or lengthen the effective portion of the bolt 232 on opposite sides of the intermediate bolt 234 for swinging the rear gangs 225 between and holding them in different tilted positions. For example, the upper nuts 239 on the inboard bolts 232 may be taken up while those on the outboard bolts 232 are let out to swing the rearward gangs shown in FIG. 16 from a position for engaging the ground on opposite sides of deep planted crops to a position, as shown in FIG. 17, for engaging such ground on opposite sides of high planted crops.

When the bolts 232 and 234 extend through the castings 235 and 236, the openings through such castings as well as the support and cross member of the bracket are enlarged to permit the bolts to swing slightly from one side to the other of a vertical position, as indicated by the broken away portion of FIG. 16. As shown in FIGS. 14 and 15, there are a number of pairs of openings 229a spaced laterally across the member 229b. These permit the bolts 232 to be extended through different pairs of such openings for adjusting the lateral position of each gang with respect to the frame. Obviously, as the rear gangs 225 of each pair are tilted at greater angles with respect to the horizontal, their inner adjacent ends are moved relatively apart so that this lateral adjustment may be necessary to keep them in laterally overlapping relation, as shown in FIGS. 14 and 15.

Although other means may be provided for tilting and laterally adjusting each rear gang, the mechanism shown is preferred because of its simplified construction as well as the ease with which it may be attached to an existing cultivator constructed in accordance with the embodiment of FIGS. 10 to 13. Thus, it is merely necessary to secure the brackets 235 and 236 to the existing support and bracket, respectively, provide the additional pairs of openings 229a through such brackets, and assemble the bolts 232 and 234.

In a preferred form of the invention, an angle iron 240 is secured to and extended rearwardly from one side of the longest support 226 for the gangs 225 to mount a plow 241 in position for engaging the ground intermediate the engagement therewith of each gang of the pair of gangs intermediate the front gangs 217. Thus, as shown in FIG. 16, when the rows of crops are deep planted, this plow 241 will engage the highest portion of the ground intermediate the crops. On the other hand, when the crops are planted high, the plows 241 will engage such ground at its lowest point. As best shown in FIGS. 16 and 17, each plow is carried from the angle iron 240 by means of a bracket 242 which is adjustable longitudinally of the angle iron and also of such construction as to enable the lower end of the plow to be raised or lowered. However, the details of the bracket 242 form no part of the present invention.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A cultivator, comprising a frame adapted to be moved forwardly over the ground, separate gangs of rotary hoes mounted from the frame for swinging about a transverse axis to rotatably engage spaced-apart rows of crops forwardly of such axis and in a laterally extending row during forward movement of the frame, means for adjusting the angular relation of the path of rotation of the hoes of each gang with respect to the forward movement of the frame, and means carried by the frame for turning the ground intermediate adjacent rows of said crops and rearwardly of the engagement therewith of said gangs onto the crops.

2. A cultivator of the character defined in claim 1, wherein said ground turning means comprises additional separate gangs of rotary hoes pivotally mounted on the frame for swinging about a transverse axis to rotatably engage the ground rearwardly of said last-mentioned axis and the engagement with the rows of the first-mentioned gangs during forward movement of the frame, and means for adjusting the angular relation of the path of rotation of the hoes of each of said additional gangs with respect to the forward movement of the frame.

3. A cultivator of the character defined in claim 2, wherein the axis about which the first-mentioned gangs swing is disposed rearwardly of the axis about which the additional gangs swing.

4. A cultivator, comprising a frame adapted to be moved forwardly over the ground, a gang of rotary hoes mounted on the frame for swinging about a transverse axis to rotatably engage a row of crops forwardly of such axis during forward movement of the frame, means for adjusting the angular relation of the path of rotation of the hoes of said gang with respect to the forward movement of the frame, and means carried by the frame for turning the ground on opposite sides of said row of crops and rearwardly of the engagement therewith of said gang onto the crops.

5. A cultivator of the character defined in claim 4, wherein said ground turning means comprises a pair of additional gangs of rotary hoes each pivotally mounted on the frame for swinging about a transverse axis to rotatably engage the ground on one opposite side of said row of crops and rearwardly of said last-mentioned axis and the engagement with the row of the first-mentioned gang during forward movement of the frame, and means for adjusting the angular relation of the path of rotation of the hoes of each of said additional gangs with respect to the forward movement of the frame.

6. A cultivator of the character defined in claim 5, wherein the axis about which the first-mentioned gang swings is disposed rearwardly of the axis about which the additional gangs swing.

7. A cultivator, comprising a frame adapted to be moved forwardly over the ground, a plurality of separate gangs of rotary hoes, means mounting the gangs from the frame for rotatably engaging spaced-apart rows of crops in a laterally extending row during forward movement of the frame, the mounting means for each gang including a support pivotally connected to the frame for swinging about a transverse axis and extending substantially longitudinally therefrom, a plate on the forward end of the support, a bracket including a plate and bars extending substantially longitudinally therefrom in the same direction as the support to support the gang of rotary hoes about an axis longitudinally spaced from said last-mentioned plate, and means connecting the bracket to the support for swinging about a vertical axis comprising lateral slots in one and spaced-apart longitudinal slots in the other of the plates of the support and bracket, and bolts extending through the slots.

8. A cultivator, comprising a frame adapted to be moved forwardly over the ground, separate gangs of rotary hoes individually mounted on the frame for swinging about a transverse axis to rotatably engage spaced-apart rows of crops in a laterally extending row during forward movement of the frame, additional separate gangs of rotary hoes individually mounted from the frame for swinging about a transverse axis to rotatably engage the ground between the rows of crops rearwardly of the engagement of the hoes of the first-mentioned gangs therewith during forward movement of the frame, and means for adjusting the angular relation of the path of rotation of the hoes of each gang with respect to the forward movement of the frame.

9. A cultivator of the character defined in claim 8, wherein the additional gangs include a single gang engageable with the ground between adjacent rows of crops engaged by the first-mentioned gangs.

10. A cultivator of the character defined in claim 8, wherein the additional gangs include a pair of gangs engageable with the ground between adjacent rows of the crops engaged by the first-mentioned gangs and swingable between convergent and divergent positions.

11. A cultivator of the character defined in claim 10, including means for adjusting and fixing the angular relation of each gang of each pair of gangs with respect to the ground level between positions tilted from one side to the other of a level position.

12. A cultivator of the character defined in claim 10, wherein the gangs of each pair are mounted to engage the ground in longitudinally offset relation with one another.

13. A cultivator of the character defined in claim 8, including means for adjusting the position of each additional gang laterally of the frame.

14. A cultivator, comprising a frame adapted to be moved forwardly over the ground, a plurality of separate gangs of rotary hoes, means individually pivotally mounting the gangs from the frame for swinging about a transverse axis to rotatably engage spaced-apart rows of crops in a laterally extending row during forward movement of the frame, means for swinging the gangs about a vertical axis to adjust the angular relation of the path of rotation of the hoes of each gang with respect to the forward movement of the frame, additional separate gangs of rotary hoes, means individually pivotally mounting such additional gangs from the frame for swinging about a transverse axis to rotatably engage the ground in pairs rearwardly of and laterally intermediate the engagement of the first-mentioned gangs with the rows of crops during said forward movement of the frame, the gangs of each pair being longitudinally spaced of one another, and means for swinging the gangs of each pair about vertical axes between positions in which the paths of rotation of the hoes thereof are rearwardly convergent or divergent.

15. A cultivator of the character defined in claim 14, including means pivotally mounting each gang of said pair for swinging about an axis disposed at least substantially horizontal with respect to the ground level to tilt it from one side to the other and fix it in such tilted position.

16. A cultivator of the character defined in claim 15, including a plow carried on the mounting means for one gang of each of said pair of gangs to break the ground intermediate and rearwardly of the engagement therewith of said pair.

17. A cultivator of the character defined in claim 14, wherein the axis about which each of the first-mentioned gangs swings is disposed rearwardly of the engagement of said gang with a row of crops, and the axis about which each of said additional gangs swings is disposed forwardly of the engagement of said gang with the ground intermediate said rows of crops.

18. A cultivator of the character defined in claim 14, including means for adjusting the position of each additional gang laterally of the frame.

19. A cultivator of the character defined in claim 18, including means pivotally mounting each gang of said pair for swinging about an axis disposed at least substantially horizontal with respect to the ground level to tilt it from one side to the other and fix it in such tilted position.

20. A cultivator, comprising a frame adapted to be moved forwardly over the ground, a gang of rotary hoes mounted on the frame for swinging about a transverse axis to rotatably engage a row of crops during forward movement of the frame, a pair of additional gangs of rotary hoes each mounted from the frame for swinging about a transverse axis to rotatably engage the ground on each opposite side of the row of crops and rearwardly of the engagement of the hoes of the first-mentioned gang therewith during forward movement of the frame, and means for adjusting the angular relation of the path of rotation of the hoes of each gang with respect to the forward movement of the frame.

21. A cultivator of the character defined in claim 20, including means for adjusting and fixing the angular relation of each gang of said pair of gangs with respect to the ground level between positions tilted from one side to the other of a level position.

22. A cultivator, comprising a frame adapted to be moved forwardly over the ground, a gang of rotary hoes, means pivotally mounting the gang from the frame for swinging about a transverse axis to rotatably engage a row of crops during forward movement of the frame, means for swinging the gang about a vertical axis to adjust the angular relation of the path of rotation of the hoes of said gang with respect to the forward movement of the frame, a pair of additional gangs of rotary hoes, means pivotally mounting each such additional gang from the frame for swinging about a transverse axis to rotatably engage the ground on each opposite side of said row of crops during said forward movement of the frame, and means for swinging the gangs of said pair about vertical axes between positions in which the paths of rotation of the hoes thereof are rearwardly convergent or divergent.

23. A cultivator of the character defined in claim 22, including means for adjusting and fixing the angular relation of each gang of said pair of gangs with respect to the ground level between positions tilted from one side to the other of a level position.

24. A cultivator of the character defined in claim 23, including means for adjusting each gang of said pair of gangs laterally of the frame.

25. A cultivator, comprising a frame adapted to be moved over the ground, separate gangs of rotary hoes pivotally mounted on the frame for rotatably engaging spaced-apart rows of crops during forward movement of the frame, additional gangs of rotary hoes each comprising a substantially U-shaped bracket carrying a shaft upon which the hoes are rotatably mounted, supports pivotally mounted on the frame to mount the additional gangs for rotatably engaging the ground intermediate the crops and in longitudinally offset pairs, each support having a bearing part thereon and the bracket of the gang mounted on said support having an upper cross member with a bearing part thereon slidable over the support bearing part for tilting the bracket from one side to the other, a pair of slots in one of said support and bracket, said upper cross members having bolt receiving means extending along the upper cross member, and means including bolts extending through the slots and bolt receiving means to alternately hold the bracket bearing part tightly against the support bearing part and permit the bolts to be swung within the slots for disposing the rotary hoes of each pair in rearwardly divergent or convergent relation with respect to the forward movement of the frame and to be moved into different locations within the bolt receiving means to adjust the lateral position of said bracket with respect to said support.

26. A cultivator of the character defined in claim 25, including a plow on the support for the rearwardly disposed gang of each pair of gangs for breaking the ground intermediate and rearwardly of the engagement therewith of said pair.

No references cited.